United States Patent
Fuse

(10) Patent No.: US 7,796,339 B2
(45) Date of Patent: Sep. 14, 2010

(54) IMAGE DISPLAY APPARATUS AND PROJECTOR

(75) Inventor: Makoto Fuse, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/357,738

(22) Filed: Jan. 22, 2009

(65) Prior Publication Data

US 2009/0195881 A1 Aug. 6, 2009

(30) Foreign Application Priority Data

Feb. 6, 2008 (JP) .............................. 2008-026016

(51) Int. Cl.
G02B 27/14 (2006.01)

(52) U.S. Cl. ..................................... 359/634

(58) Field of Classification Search .................. 359/634
See application file for complete search history.

(56) References Cited

U.S. PATENT DOCUMENTS 5,917,561 A 6/1999 Hatanaka 6,379,010 B1 4/2002 Suzuki et al.
6,942,347 B2 * 9/2005 Sugawara et al. ............. 353/33

FOREIGN PATENT DOCUMENTS

| JP | A-03-291644 | 12/1991 |
| JP | A-06-018834 | 1/1994 |
| JP | A 8-152593 | 6/1996 |
| JP | A-10-048762 | 2/1998 |
| JP | A 10-133303 | 5/1998 |
| JP | A-2000-010047 | 1/2000 |
| JP | A 2000-227578 | 8/2000 |
| JP | A-2003-098596 | 4/2003 |
| JP | A-2008-003270 | 1/2008 |

* cited by examiner

*Primary Examiner*—Joseph Martinez
(74) *Attorney, Agent, or Firm*—Oliff & Berridge, PLC

(57) ABSTRACT

An image display apparatus includes a light source that emits light-source light, an illumination system that makes the light-source light uniform, a color separation system that separates illumination light outputted from the illumination system into color light fluxes, color optical modulators illuminated with the color light fluxes separated by the color separation system, and an optical element having an element surface the film thickness distribution of which is configured in such a way that the film thickness changes in a non-uniform manner.

14 Claims, 9 Drawing Sheets

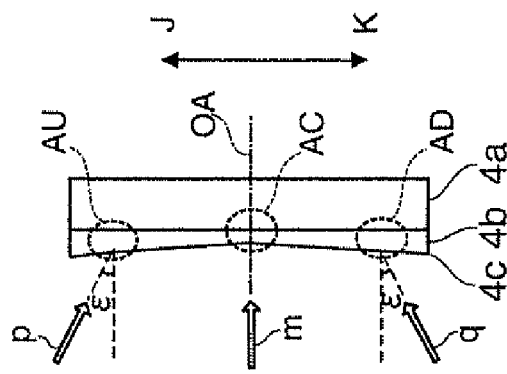
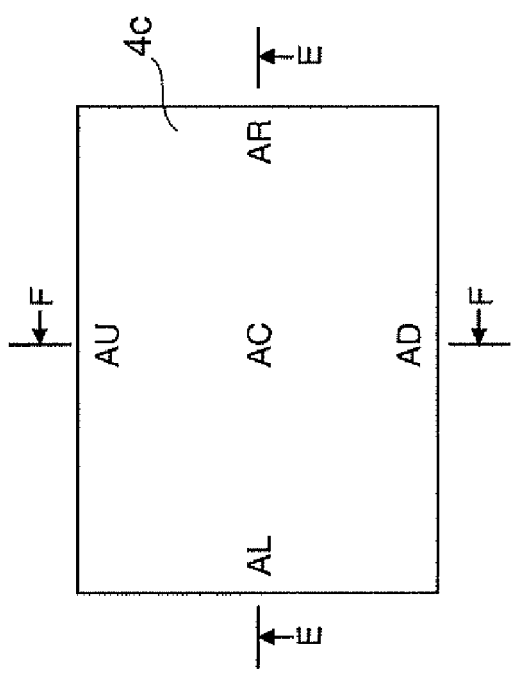
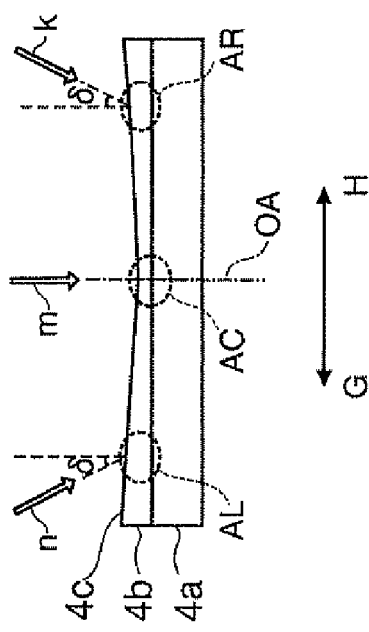

IMAGE DISPLAY APPARATUS AND PROJECTOR

BACKGROUND

1. Technical Field

The present invention relates to an image display apparatus in which an illumination system illuminates a liquid crystal panel or any other similar component to form an image thereon, and a projector.

2. Related Art

In an image display apparatus, a dichroic mirror and other optical elements have a dependence on the angle of incidence of a light beam, and optical characteristics such optical elements (specifically, a cutoff half-height wavelength, for example) change with the angle of incidence of a light beam. Therefore, for example, optical characteristics of an inclined dichroic mirror disposed in a color separation system change in the plane of the dichroic mirror, disadvantageously resulting in variation in color characteristics of the image display apparatus. To address the problem, there is an apparatus capable of eliminating a dependence on the angle of an incident light beam by employing gradient characteristics in the right-left direction (corresponding to the longitudinal right-left direction of the plane) of a multilayer film of a dichroic mirror to change the dichroic characteristics in accordance with the angle of incidence (see JP-A-3-291644, for example). There is another apparatus capable of preventing deviation in optical characteristics by providing unevenness in thickness or in refractive index that is gradient in a specific direction of a dichroic mirror (see JP-A-6-18834, for example).

The dichroic mirrors described above, in which gradient optical characteristics are simply introduced, for example, in the right-left direction, however, cannot exactly or approximately eliminate the dependence on the angle of a light beam. The dependence on the angle of an incident light beam is therefore still present, disadvantageously resulting in residual unevenness in color of a projected image.

SUMMARY

An advantage of some aspects of the invention is to provide an image display apparatus capable of reducing unevenness in color of a projected image by changing optical characteristics of an optical element in a non-uniform manner.

Another advantage of some aspects of the invention is to provide a projector including the image display apparatus described above.

To solve the above problem, an image display apparatus according to an aspect of the invention includes a light source that emits light-source light, an illumination system that makes the light-source light uniform, a color separation system that separates illumination light outputted from the illumination system into color light fluxes, color optical modulators illuminated with the color light fluxes separated by the color separation system, and an optical element having an element surface the film thickness distribution of which is configured in such a way that the film thickness changes in a non-uniform manner.

In the above image display apparatus, since the optical element has a film thickness distribution in which the film thickness changes in a non-uniform manner, an optical characteristic deviation resulting from a dependence of the illumination light on the angle of incidence can be exactly or approximately corrected at least in one direction of the optical element. In this way, the optical element can appropriately reflect or transmit a desired wavelength component in each position on the element surface of the optical element, whereby unevenness in color of a projected image can be eliminated.

In a specific embodiment or viewpoint of the invention, the film thickness distribution causes a transmission and reflection optical characteristic that corresponds to the angle of incidence of the illumination light to change in a non-uniform manner in the plane of the optical element. In this case, since the film thickness distribution causes optical characteristics that correspond to the angle of incidence of the illumination light to change in a non-uniform manner, an optical characteristic deviation resulting from a dependence of the illumination light on the angle of incidence can be exactly or approximately corrected at least in one direction of the optical element.

According to another embodiment of the invention, the optical characteristic of the optical element is a cutoff half-height wavelength that depends on the film thickness configuration of a multilayer film. In this case, changing the cutoff half-height wavelength allows deviation in the optical characteristic that depends on the angle of incidence in each position on the element surface of the optical element to be corrected. The cutoff half-height wavelength used herein is a wavelength at which the transmittance is 50%.

According to another embodiment of the invention, the film thickness distribution is configured in such a way that the rate of change in the optical characteristic changes with the position on the element surface in a first direction parallel to the element surface. In this case, configuring the film thickness distribution in such a way that the optical characteristic that corresponds to the angle of incidence of the illuminated light changes in a non-uniform manner allows the optical characteristic of the optical element to be corrected in the first direction.

According to another embodiment of the invention, the film thickness distribution is configured in such a way that the rate of change in the optical characteristic changes with the position on the element surface in a second direction parallel to the element surface but inclined to the first direction by a predetermined angle. In this case, configuring the film thickness distribution in such a way that the optical characteristic that corresponds to the angle of incidence of the illuminated light changes in a non-uniform manner also in the second direction allows the optical characteristic of the optical element to be corrected two-dimensionally.

According to another embodiment of the invention, the first direction is perpendicular to the second direction. In this case, for example, changing the optical characteristic in the right-left and up-down directions of the optical element allows the optical characteristic of the optical element to be corrected two-dimensionally.

According to another embodiment of the invention, the film thickness distribution has a portion where the magnitude of the gradient of the rate of change in the optical characteristic changes. In this case, the optical characteristic can correspond to the angle of incidence of the illuminated light, whereby a multilayer film and other components that form the optical element are readily designed.

According to another embodiment of the invention, the optical element is a dichroic mirror. In this case, correcting the optical characteristic of the dichroic mirror allows the dichroic mirror to efficiently transmit or reflect part of the illuminated light that has a desired wavelength.

According to another embodiment of the invention, the optical element is a dichroic film. In this case, correcting the optical characteristic of the cutoff wavelength or other parameters of the dichroic film allows the dichroic film to efficiently transmit or reflect part of the illuminated light that has a desired wavelength.

A projector according to another aspect of the invention includes the image display apparatus described above, a combining system that combines the color image light fluxes outputted from the color optical modulators, and a projection system that projects the image light that have passed through the combining system.

In the projector described above, providing the image display apparatus described above allows unevenness in color of a projected image to be eliminated.

BRIEF DESCRIPTION OF THE DRAWINGS

The invention will be described with reference to the accompanying drawings, wherein like numbers reference like elements.

FIG. 4 shows a dependence of the transmittance characteristic on the angle of incidence in an area AC of the first dichroic mirror 31a.

FIGS. 6A to 6C are conceptual diagrams of any of dichroic mirrors in FIG. 5.

DESCRIPTION OF EXEMPLARY EMBODIMENTS

First Embodiment

The structure and other characteristics of an image display apparatus and a projector according to a first embodiment of the invention will be described below with reference to the drawings.

Figure 1:
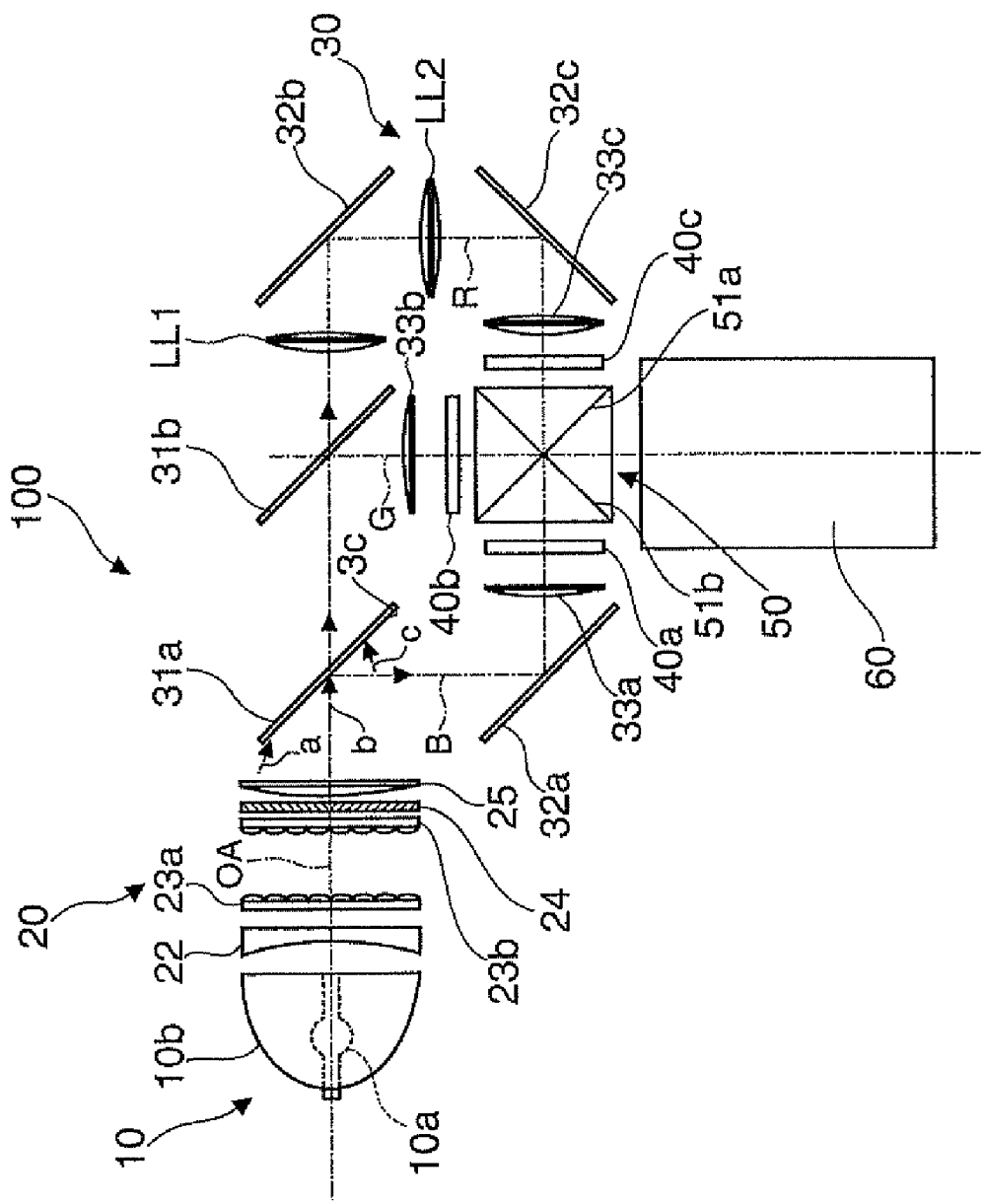
FIG. 1 is a conceptual diagram explaining a projector including an image display apparatus according to a first embodiment of the invention.

FIG. 1 is a conceptual diagram for explaining the structure of the projector including the image display apparatus of the first embodiment. The projector 200 includes a light source 10, an illumination system 20, a color separation system 30, liquid crystal light valves 40a, 40b, and 40c, which are optical modulators, a cross dichroic prism 50, which is a combining system, and a projection lens 60, which is a projection system. In the projector 200, the image display apparatus 100, which is an optical engine for forming an image, includes the light source 10, the illumination system 20, the color separation system 30, and liquid crystal light valves 40a, 40b, and 40c.

In the image display apparatus 100, the light source 10 is, for example, a light source apparatus that emits substantially white light having an intensity large enough to form image light, such as a high-pressure mercury lamp. The light source 10 includes an arc tube 10a that emits light-source light and a reflector 10b having a concave mirror that reflects the light-source light from the arc tube 10a forward.

The illumination system 20 includes a parallelizing lens 22, which is a light parallelizing unit that parallelizes the light-source light, first and second fly-eye lenses 23a, 23b that form an optical integration system for producing uniform light through separation and superposition processes, a polarization conversion element 24 that aligns polarization directions of light, and a superimposing lens 25 that superimposes the light fluxes that have passed through the two fly-eye lenses 23a and 23b. The illumination system 20 thus forms substantially white illumination light. In the illumination system 20, the parallelizing lens 22 converts the light flux directions of the illumination light emitted from the light source 10 into substantially parallel directions. Each of the first and second fly-eye lenses 23a, 23b is comprised of a plurality of element lenses arranged in a matrix. The element lenses that form the first fly-eye lens 23a divide the light that has passed through the parallelizing lens 22 and focus the divided individual light fluxes. The element lenses that form the second fly-eye lens 23b convert the divided light fluxes from the first fly-eye lens 23a into exiting light fluxes having an appropriate angle of divergence. The polarization conversion element 24 is formed of an array comprised of sets of a PBS, a mirror, a retardation film, and other components, and serves to align the polarization directions of the segmented light fluxes divided by the first fly-eye lens 23a into linearly polarized light fluxes having one common polarization direction. The superimposing lens 25 converges appropriately the illumination light as a whole that has passed through the polarization conversion element 24 to achieve superimposed illumination on illuminated areas of the liquid crystal light valves 40a, 40b, and 40c, which are color optical modulators located in a downstream section.

The color separation system 30 includes first and second dichroic mirrors 31a, 31b, reflection mirrors 32a, 32b, and 32c, and three field lenses 33a, 33b, and 33c. The first and second dichroic mirrors 31a, 31b are disposed in such a way that they are inclined to a system optical axis OA extending from the illumination system 20 by 45 degrees, as shown in FIG. 1. The color separation system 30 separates the illumination light made uniform by the illumination system 20 into three blue (B), green (G), and red (R) color light fluxes, and guides them to the liquid crystal light valves 40a, 40b, and 40c in a downstream section. More specifically, among the three BGR colors, the first dichroic mirror 31a transmits the G and R light and reflects the B light. For the two G and R colors, the second dichroic mirror 31b reflects the G light and transmits the R light. Then, in the color separation system 30, the B light reflected off the first dichroic mirror 31a is reflected off the reflection mirror 32a and incident on the field lens 33a that adjusts the angle of incidence. The G light that has passed through the first dichroic mirror 31a and has been reflected off the second dichroic mirror 31b is incident on the field lens 33b that adjusts the angle of incidence. The R light that has passed through the second dichroic mirror 31b passes through relay lenses LL1 and LL2, is reflected off the reflection mirrors 32b and 32c, and is incident on the field lens 33c that adjusts the angle of incidence.

The liquid crystal light valves 40a, 40b, and 40c, each of which is a non-luminous optical modulator that modulates the spatial intensity distribution of incident illumination light, are illuminated with the respective color light fluxes outputted from the color separation system 30. The B light reflected off the first dichroic mirror 31a is incident on the liquid crystal light valve 40a via the field lens 33a and other components. The G light that has passed through the first dichroic mirror 31a and has been reflected off the second dichroic mirror 31b is incident on the liquid crystal light valve 40b via the field lens 33b and other components. The R light that has passed through the first and second dichroic mirrors 31a, 31b is incident on the liquid crystal light valve 40c via the field lens 33c and other components. The liquid crystal light valves 40a, 40b, and 40c, when transmitting the illumination light fluxes having the respective colors, form image light fluxes having the respective colors.

The cross dichroic prism 50 combines the color image light fluxes from the liquid crystal light valves 40a, 40b, and 40c. More specifically, the cross dichroic prism 50 is formed by bonding four rectangular prisms and thus has a substantially square shape when viewed from above. A pair of X-shaped intersecting dielectric multilayer films 51a and 51b are formed along the interfaces between these bonded rectangular prisms. One of the dielectric multilayer films, the first dielectric multilayer film 51a, reflects the B light, whereas the other one, the second dielectric multilayer film 51b, reflects the R light. In the cross dichroic prism 50, the B light from the liquid crystal light valve 40a is reflected off the dielectric multilayer films 51a and outputted to the right when viewed in the traveling direction. The G light from the liquid crystal light valve 40b passes through the dielectric multilayer films 51a and 51b, travels straight, and exits from the cross dichroic prism 50. The R light from the liquid crystal light valve 40c is reflected off the dielectric multilayer film 51b and outputted to the left when viewed in the travelling direction. The cross dichroic prism 50 thus combines the B light, G light, and R light to form combined light, which is image light that corresponds to a color image.

The projection lens 60, which is a projection system, enlarges the image light, which is the combined light formed in the cross dichroic prism 50, at a desired magnification, and projects a color image on a screen (not shown).

Figure 2A:
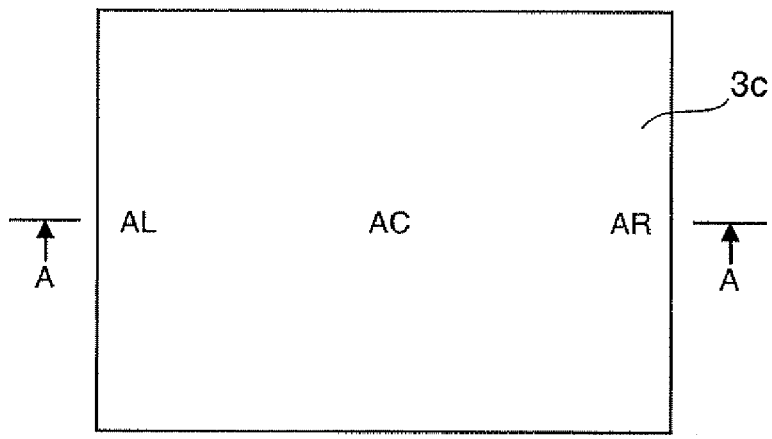
FIGS. 2A and 2B are conceptual diagrams of a first dichroic mirror in FIG. 1.
Figure 2B:
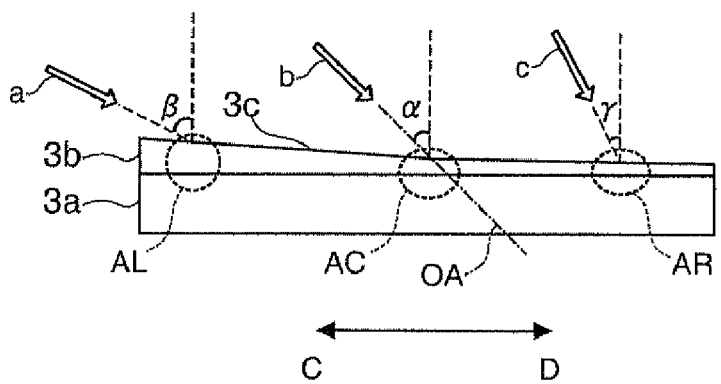
Figure 2C:
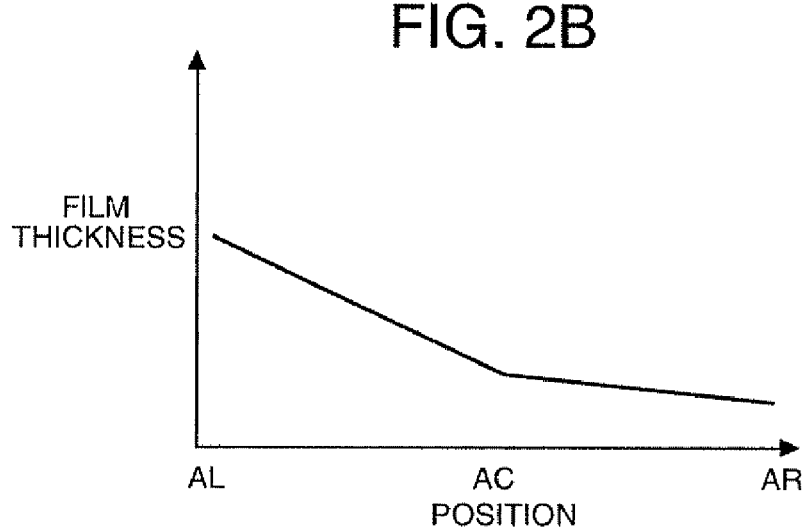
FIG. 2C shows film thickness distribution.

The structure and function of the first dichroic mirror 31a that forms the color separation system 30 will be described below with reference to the drawings. FIGS. 2A and 2B are conceptual diagrams of the first dichroic mirror 31a, and FIG. 2C shows film thickness distribution. FIG. 2A is a front view of the first dichroic mirror 31a. FIG. 2B is a cross-sectional view of the first dichroic mirror 31a taken along the line A-A. FIG. 2C shows the film thickness of a dielectric multilayer film 3b versus the position on the first dichroic mirror 31a.

The illumination light that passes through the superimposing lens 25 and is incident on the first dichroic mirror 31a is convergent light as a whole, so that the angle of incidence with respect to the first dichroic mirror 31a varies in the light flux cross section. In consideration of such a situation, the film thickness distribution of the first dichroic mirror 31a is changed in a non-uniform manner in the longitudinal right-left direction CD, as will be described later in detail. The first dichroic mirror 31a is disposed in such a way that it is inclined to the system optical axis OA extending from the illumination system 20 by 45 degrees, as shown in FIG. 1. As shown in FIGS. 2A to 2C, the first dichroic mirror 31a has a structure in which the dielectric multilayer film 3b is formed on one side of a transparent flat glass plate 3a, which is a substrate. That is, the dielectric multilayer film 3b is configured in such a way that the rate of increase in film thickness changes along the longitudinal right-left direction CD, and the rate of change in optical characteristics on the left side in the right-left direction CD differs from the rate of change in optical characteristics on the right side. A conceivable method for fabricating the first dichroic mirror 31a is as follows: The flat glass plate 3a, which is a substrate of the first dichroic mirror 31a, is first disposed to face a deposition sources for example, while rotating around its own axis and orbiting around the deposition source. The dielectric multilayer film 3b is then formed by adjusting the amount of a dielectric material to be deposited in each position on the flat glass plate 3a, for example, by using a mask interposed between the flat glass plate 3a and the deposition source. The surface of the dielectric multilayer film 3b is an element surface 3c of the first dichroic mirror 31a.

Specific characteristics of the first dichroic mirror 31a will be described below. As shown in FIGS. 2A to 2C, since the illumination light from the light source 10 is not perfectly parallelized as described above, angles of incidence $\alpha$, $\beta$, and $\gamma$ of the illumination light in different positions on the element surface 3c of the first dichroic mirror 31a differ from one another. The angle of incidence of the illumination light incident on the element surface 3c therefore deviates from 45 degrees depending on the position on the element surface 3c. In consideration of this situation, the dielectric multilayer film 3b on the first dichroic mirror 31a is configured in such a way that different thickness values are set for the angles of incidence $\alpha$, $\beta$, and $\gamma$ of the illumination light to change the transmittance characteristic or other optical characteristics accordingly. That is, the dielectric multilayer film 3b is configured in such a way that the transmittance characteristic changes in a first direction, that is, along the element surface 3c in the right-left direction CD along the cross-section A-A. Specifically, in FIG. 1, the angle of incidence $\beta$ of a light beam "a" incident on the left side of the first dichroic mirror 31a is greater than the angle of incidence $\alpha$ of a light beam "b" incident on the center of the first dichroic mirror 31a, and the thickness of an area AL of the dielectric multilayer film 3b is set to be greater than the thickness of an area AC. On the other hand, the angle of incidence $\gamma$ of a light beam "c" incident on the right side of the first dichroic mirror 31a is smaller than the angle of incidence $\alpha$, and the thickness of an area AR of the dielectric multilayer film 3b is set to be smaller than the thickness of the area AC. That is, as shown in FIG. 2C, in the right-left direction CD along the cross section A-A, the film thickness of the dielectric multilayer film 3b increases at a first rate from the area AR to the area AC and at a second rate greater than the first rate from the area AC to the area AL.

Figure 3:
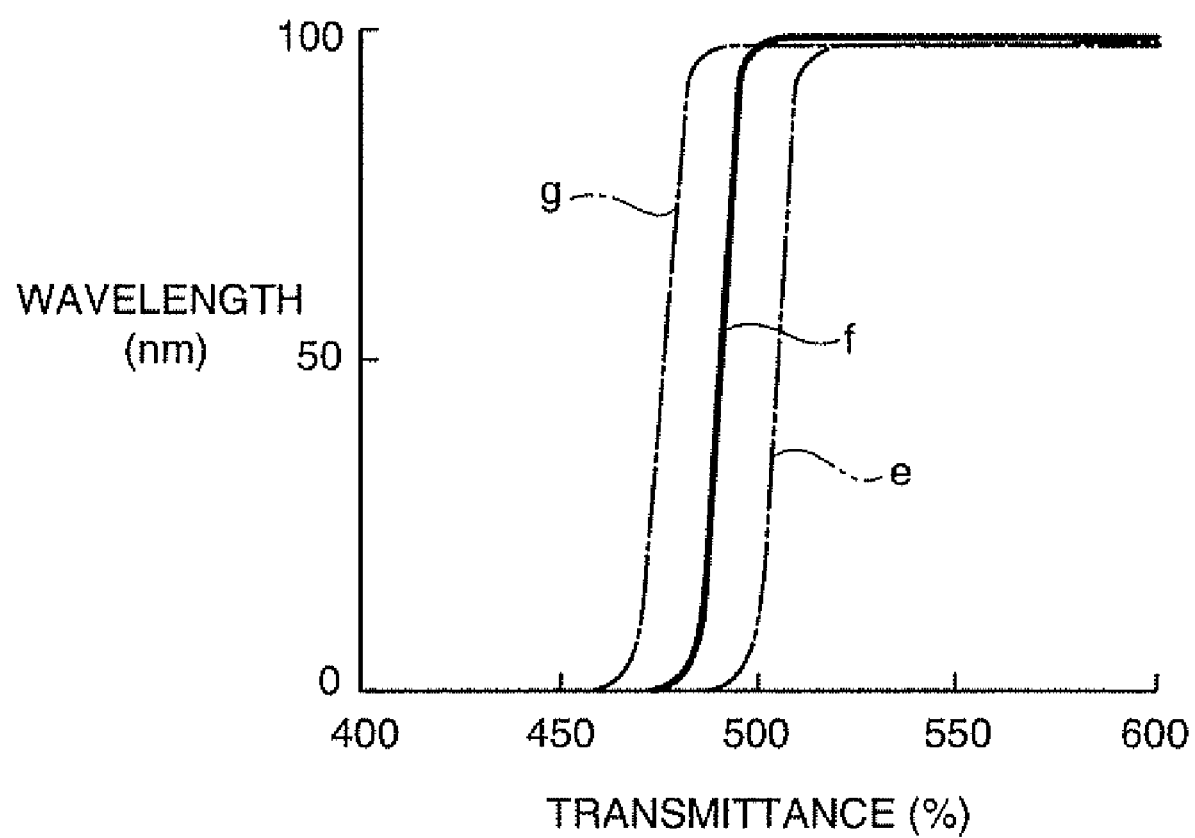
FIG. 3 shows the transmittance characteristic of the first dichroic mirror in FIG. 1.
Figure 4:
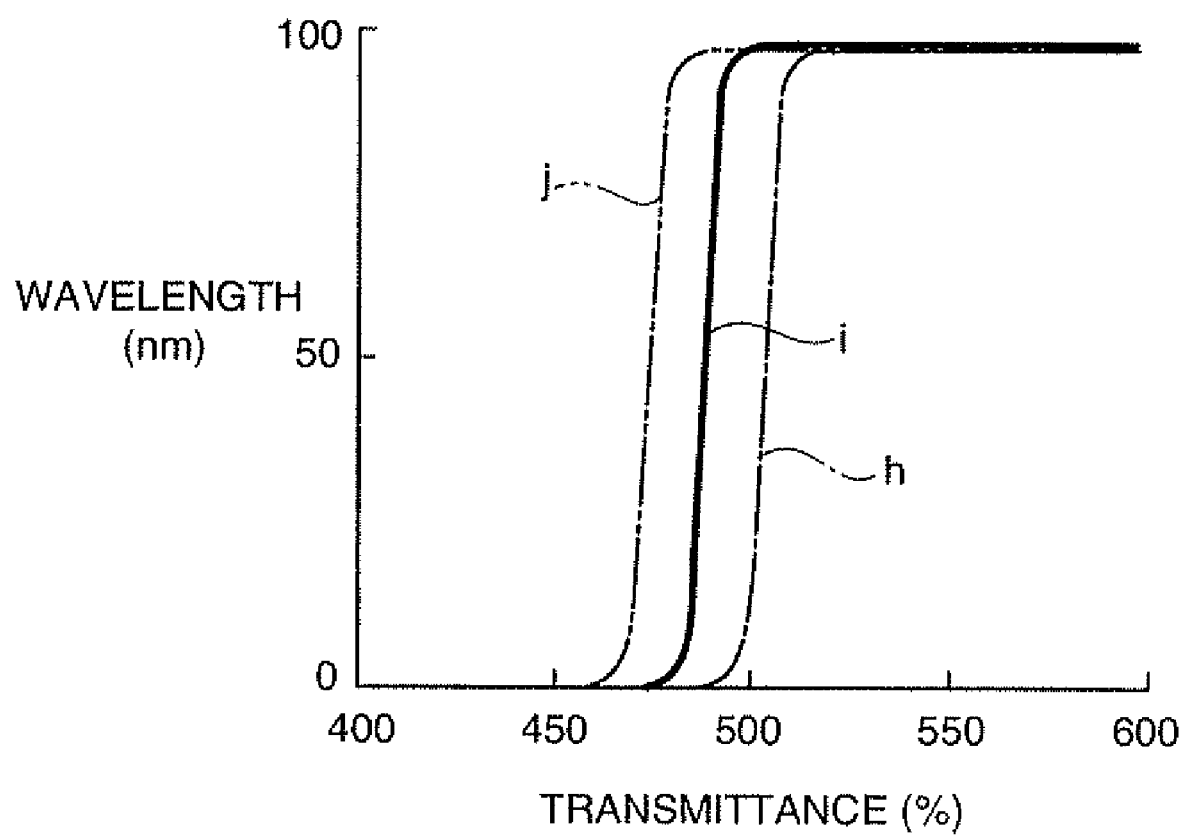

FIG. 3 shows the transmittance of the first dichroic mirror 31a versus the wavelength of illumination light incident thereon. FIG. 4 shows dependence of the transmittance characteristic on the angle of incidence in the area AC of the first dichroic mirror 31a. The transmittance characteristics "e", "f," and "g" shown in FIG. 3 are obtained when the angle of incidence with respect to the element surface 3c is 45 degrees, and correspond to the transmittance characteristics in the areas AL, AC, and AR, respectively, on which the light beams "a", "b," and "c" in FIGS. 1 and 2A to 2C are incident. The transmittance characteristics "h," "i" and "j" shown in FIG. 4 are those when the angle of incidence $\alpha$ of the illumination light incident on the element surface 3c in the area AC is 30 degrees, 45 degrees, and 60 degrees, respectively.

As shown in FIG. 4, in the area AC, the cutoff half-height wavelength shifts toward the shorter-wavelength side as the angle of incidence $\alpha$ increases, whereas the cutoff half-height wavelength shifts toward the longer-wavelength side as the angle of incidence $\alpha$ decreases. This holds true in the other areas AL and AR. That is, the cutoff half-height wavelengths shift toward the shorter-wavelength side as the angles of incidence $\beta$ and $\gamma$ increase, whereas the cutoff half-height wavelengths shift toward the longer-wavelength side as the angles of incidence $\beta$ and $\gamma$ decrease. The relationship shown in FIG. 3 can therefore be used to apparently shift the transmittance characteristic "e" to the transmittance characteristic "f" so that the transmittance characteristic in the area AL apparently coincides with that in the area AC by increasing the film thickness in such a way that increase in the angle of incidence β is canceled in the area AL where the angle of incidence β is typically large. Further, decreasing the film thickness in such a way that decrease in the angle of incidence γ is canceled in the area AR where the angle of incidence γ is typically small allows the transmittance characteristic "g" to be apparently shifted to the transmittance characteristic "f" so that the transmittance characteristic in the area AR apparently coincides with that in the area AC. To this end, the rate of increase in film thickness of the dielectric multilayer film 3b and hence the rate of change in the transmittance characteristic of the first dichroic mirror 31a in the right-left direction CD is changed at the area AC from the first rate to the second rate in a non-uniform manner. That is, the rate of increase in film thickness in the area AR is set to the relatively small first rate, whereas the rate of increase in film thickness in the area AL is set to the relatively large second rate, whereby the gradient of the film thickness accords with an average angle of incidence of the light incident on each of the areas.

As apparent from the above description, in the image display apparatus 100 of the present embodiment, since the first dichroic mirror 31a has a characteristic distribution that the transmittance characteristic changes in a non-uniform manner in accordance with the angles of incidence α, β, and γ of the illumination light, the deviated transmittance characteristics "e" and "f" resulting from the dependence of the illumination light on the angle of incidence, for example, shown in FIG. 3 can be apparently shifted to the transmittance characteristic "f." That is, in the present embodiment, since the cutoff half-height wavelength as the transmittance characteristic is changed in a non-uniform manner in the right-left direction CD, the transmittance characteristic distribution can be corrected exactly or approximately in the right-left direction CD of the first dichroic mirror 31a. In this way, a desired wavelength component can be reflected off or transmitted through each of the areas AR, AC, and AL of the element surface 3c of the first dichroic mirror 31a, whereby unevenness in color of a projected image can be eliminated.

Second Embodiment

An image display apparatus according to a second embodiment of the invention will be described below. The image display apparatus 110 of the second embodiment is similar to the image display apparatus 100 of the first embodiment except that part of the image display apparatus of the first embodiment is changed. The portions of the image display apparatus of the second embodiment that are not particularly described below are the same as those in the first embodiment.

Figure 5:
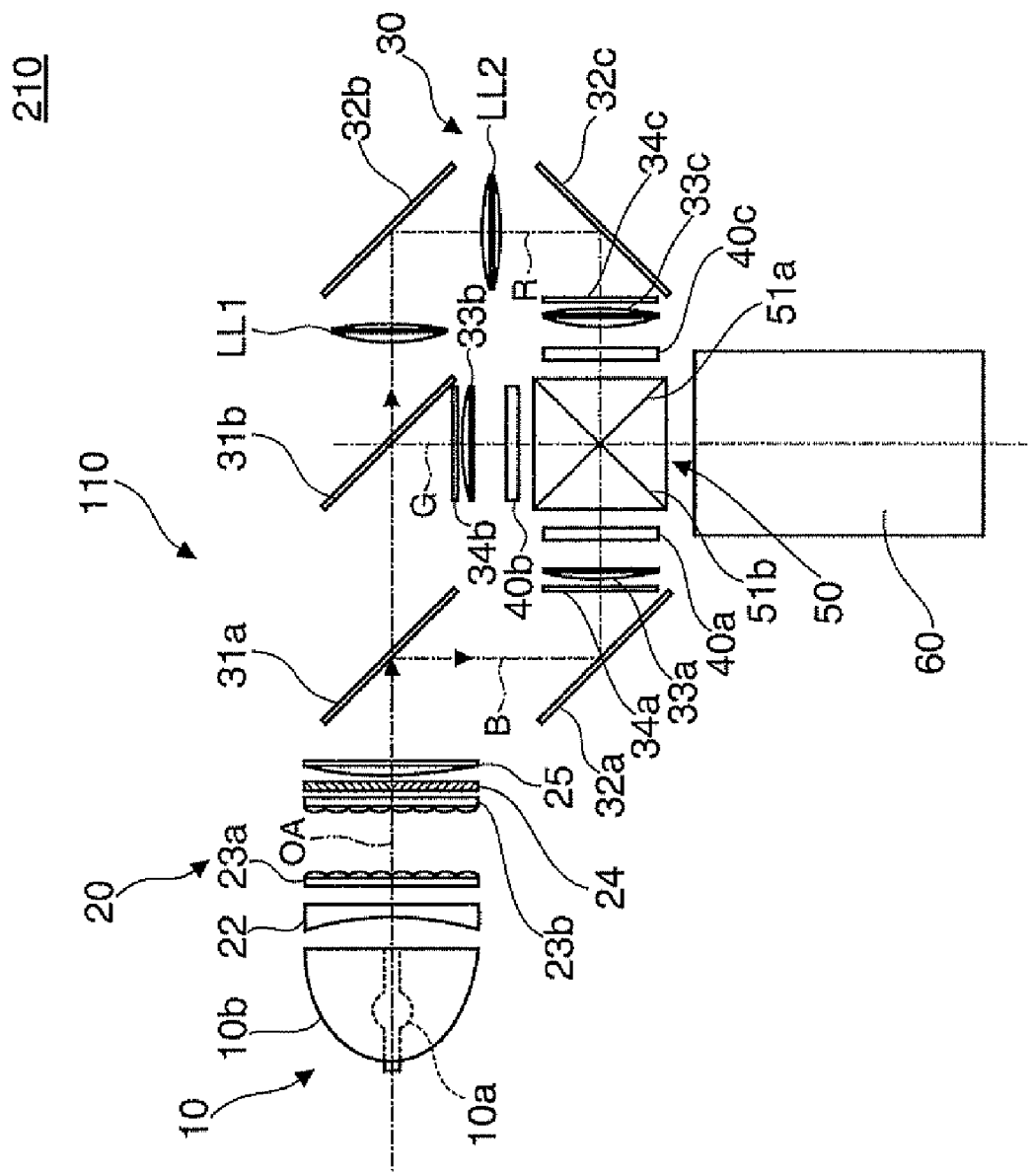
FIG. 5 is a conceptual diagram explaining a projector including an image display apparatus according to a second embodiment of the invention.

FIG. 5 is a conceptual diagram for explaining the structure of a projector 210 including the image display apparatus 110 of the second embodiment. In the image display apparatus 110, the color separation system 30 further includes dichroic mirrors 34a, 34b, and 34c upstream of the field lenses 33a, 33b, and 33c. Each of the dichroic mirrors 34a, 34b, and 34c is a wavelength cutoff filter that cuts off a predetermined wavelength. Providing the dichroic mirrors 34a, 34b, and 34c allows the color balance of a projected image to be adjusted or prevents stray light from being generated at the field lenses 33a, 33b, and 33c.

Figure 7A:
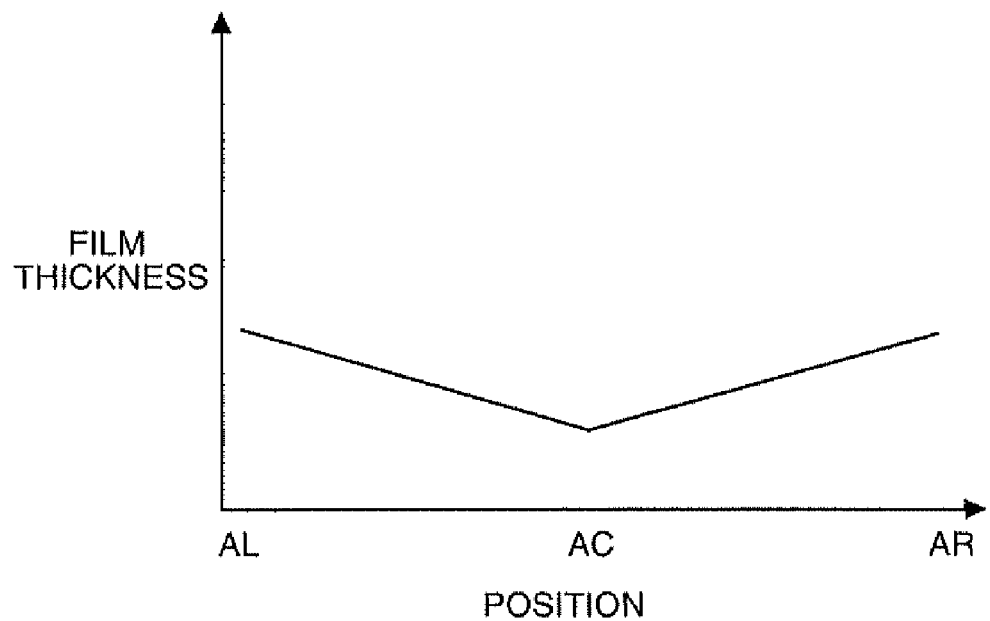
FIGS. 7A and 7B show the film thickness distribution of any of dichroic mirrors in FIG. 5.
Figure 7B:
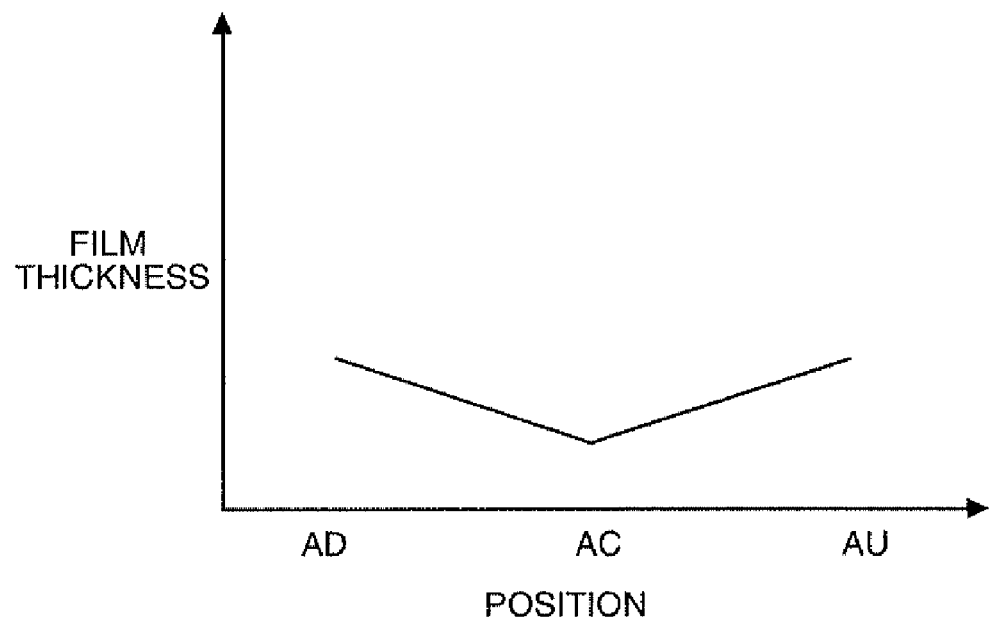

The structure and function of each of the dichroic mirrors 34a, 34b, and 34c will be described below with reference to the drawings. FIGS. 6A to 6C are conceptual diagrams of any of the dichroic mirrors 34a, 34b, and 34c. FIG. 6A is a front view of any of the dichroic mirrors 34a, 34b, and 34c. FIG. 6B is a cross-sectional view of any of the dichroic mirrors 34a, 34b, and 34c taken along the line E-E. FIG. 6C is a cross-sectional view of any of the dichroic mirrors 34a, 34b, and 34c taken along the line F-F. FIGS. 7A and 7B show the film thickness of a dielectric multilayer film 4b versus the position on any of the dichroic mirrors 34a, 34b, and 34c. FIG. 7A shows the film thickness distribution in the cross section E-E in FIG. 6B, and FIG. 7B shows the film thickness distribution in the cross section F-F in FIG. 6C.

Each of the dichroic mirrors 34a, 34b, and 34c is disposed to be perpendicular to the system optical axis OA, and has a structure in which the dielectric multilayer film 4b is formed on one side of a transparent flat glass plate 4a, which is a substrate. The surface of the dielectric multilayer film 4b is an element surface 4c of each of the dichroic mirrors 34a, 34b, and 34c.

The illumination light that passes through the superimposing lens 25 and is incident on any of the dichroic mirrors 34a, 34b, and 34c is convergent light as a whole, so that the angle of incidence with respect to any of the dichroic mirrors 34a, 34b, and 34c varies in the light flux cross section. In consideration of such a situation, the optical characteristic distribution of each of the dichroic mirrors 34a, 34b, and 34c is changed in a non-uniform manner in the longitudinal right-left direction GH and the up-down direction JK perpendicular to the right-left direction GH along the element surface 4c, as will be described later in detail. That is, the dielectric multilayer film 4b is configured in such a way that the film thickness thereof changes symmetrically with respect to the system optical axis OA in the longitudinal right-left direction GH, and the rate of change in optical characteristics on the left side in the right-left direction GH differs from the rate of change in optical characteristics on the right side. Further, the dielectric multilayer film 4b is configured in such a way that the film thickness thereof changes symmetrically with respect to the system optical axis OA in the up-down direction JK, and the rate of change in optical characteristics on the upper side in the up-down direction JK differs from the rate of change in optical characteristics on the lower side.

Specific characteristics of each of the dichroic mirrors 34a, 34b, and 34c will be described below. As shown in FIGS. 6A to 6C, since the illumination light from the light source 10 is not perfectly parallelized, angles of incidence δ and ∈ of the illumination light, that is, light beams "k," "m," "n," "p," and "q," in different positions on the element surface 4c of any of the dichroic mirrors 34a, 34b, and 34c differ from one another. The angle of incidence of the illumination light incident on the element surface 4c therefore deviates from 0 degrees depending on the position on the element surface 4c. In consideration of this situation, the dielectric multilayer film 4b on each of the dichroic mirrors 34a, 34b, and 34c is configured in such a way that a gradient thickness distribution that corresponds to the angles of incidence δ and ∈ of the illumination light changes the transmittance characteristic or other optical characteristics. That is, the dielectric multilayer film 4b is configured in such a way that the transmittance characteristic changes along the element surface 4c in a first direction, that is, in the right-left direction GH along the cross-section E-E. Specifically, as shown in FIG. 6B, in the right-left direction SH along the cross section E-E, the film thickness of the dielectric multilayer film 4b decreases at a first rate from an area AL to an area AC, and increases at a second rate the sign of which is opposite to the sign of the first rate from the area AC to an area AR. Further, as shown in FIG. 6C, in a second direction, that is, in the up-down direction JK along the cross section F-F, the film thickness of the dielectric multilayer film 4b decreases at a third rate from an area AU to the area AC, and increases at a fourth rate the sign of which is opposite to the sign of the third rate from the area AC to an area AD.

Since the optical characteristics of each of the dichroic mirrors 34a, 34b, and 34c in the right-left direction GH correspond to the angle of incidence 6 of the illumination light, as in the first dichroic mirror 31a of the first embodiment, the transmittance characteristic in each position where the illumination light is incident in the right-left direction GH is corrected, whereby a desired wavelength can be transmitted or reflected. Further, since the optical characteristics of each of the dichroic mirrors 34a, 34b, and 34c in the up-down direction JK correspond to the angle of incidence ∈ of the illumination light, the transmittance characteristic in each position where the illumination light is incident in the up-down direction JK is corrected, whereby a desired wavelength component can be transmitted or reflected.

As apparent from the above description, in the image display apparatus 110 of the present embodiment, since each of the dichroic mirrors 34a, 34b, and 34c has a characteristic distribution that the transmittance characteristics change in a non-uniform manner in accordance with the angles of incidence δ and ∈ of the illumination light, the deviation in the transmittance characteristic resulting from the dependence of the illumination light on the angle of incidence can be corrected. That is, in the present embodiment, since the cutoff half-height wavelength as the transmittance characteristic is changed in a non-uniform manner in the right-left direction GH and the up-down direction JK, the transmittance characteristic distribution can be corrected exactly or approximately in the right-left direction GH and the up-down direction JK of each of the dichroic mirrors 34a, 34b, and 34c. In this way, a desired wavelength component can be reflected off or transmitted through each of the areas AL, AC, AR, AU, and AD of the element surface 4c of each of the dichroic mirrors 34a, 34b, and 34c, whereby unevenness in color of a projected image can be eliminated two-dimensionally.

The invention is not limited to the embodiments described above, but can be implemented in a variety of aspects to the extent that they do not depart from the spirit of the invention. For example, the following variations are possible.

Figure 8A:
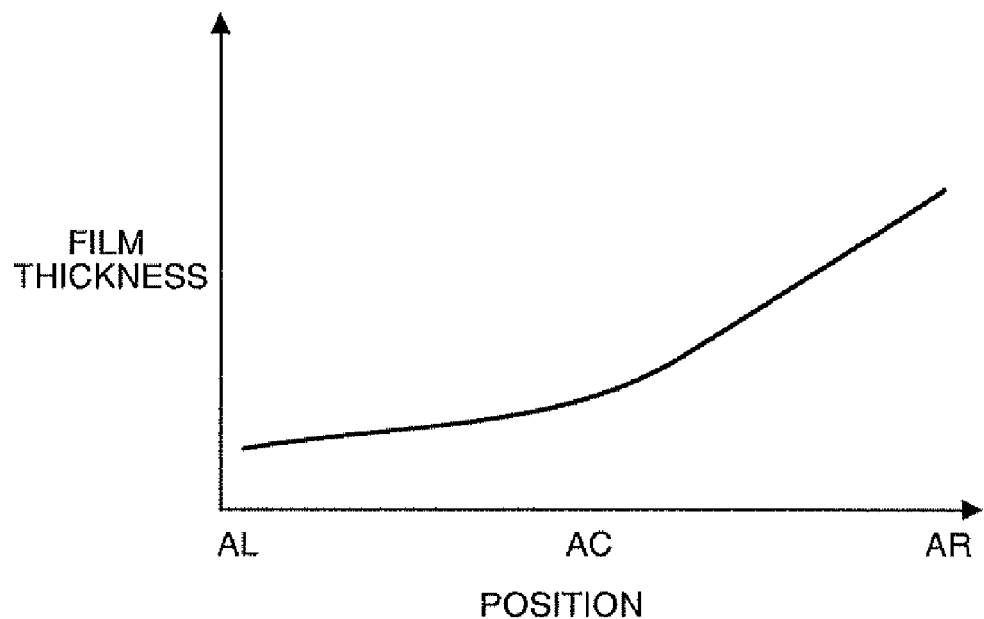
FIGS. 8A and 8B show a variation of the film thickness distribution in FIG. 2C.
Figure 8B:
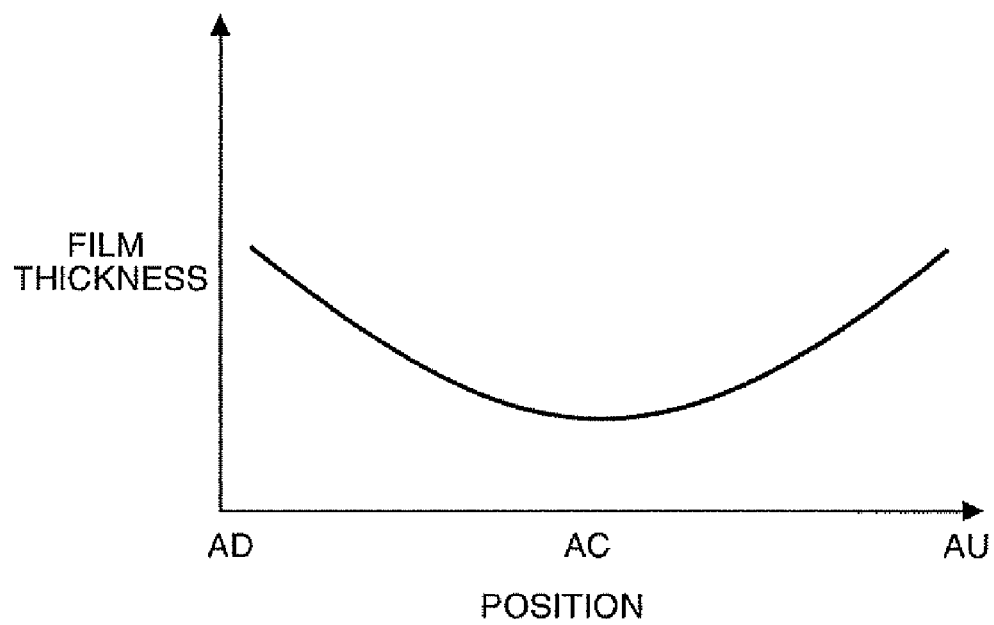

In the image display apparatus 100 and other image display apparatus described above, the film thickness distributions of the first dichroic mirror 31a and the dichroic mirrors 34a, 34b, and 34c is not limited to those described above, but can be any appropriate film thickness distribution according to the angle of incidence of the illumination light. For example, as shown in FIGS. 8A and 8B, the film thickness distribution may follow a smooth curve. In this case, since the transmittance characteristics of any of the first dichroic mirror 31a and the dichroic mirrors 34a, 34b, and 34c in the right-left directions CD, GH and the up-down direction JK correspond to the angles of incidence α, β, γ, δ, and ∈ of the illumination light, the transmittance characteristic in each position where the illumination light is incident in the right-left directions CD, GH and the up-down direction JK is corrected, whereby a desired wavelength component can be transmitted or reflected more exactly.

In the above embodiments, while the optical characteristics of the first dichroic mirror 31a and the dichroic mirrors 34a, 34b, and 34c are corrected, optical characteristics of the second dichroic mirror 31b may also be corrected. In this case, for example, the correction is made in accordance with the deviation in transmittance characteristic of the second dichroic mirror 31b. Further, such correction of optical characteristics can be applied not only to a dichroic mirror but also to an ND filter and other optical elements.

In the above embodiments, while the optical characteristics of the first dichroic mirror 31a and the dichroic mirrors 34a, 34b, and 34c are corrected when the illumination light is convergent, the correction can also be made when the illumination light is divergent in accordance with the optical characteristics under such a condition.

In the above embodiments, while the first dichroic mirror 31a reflects B light, the correction can also be made when the first dichroic mirror 31a reflects R light in accordance with the optical characteristics under such a condition.

Figure 9:
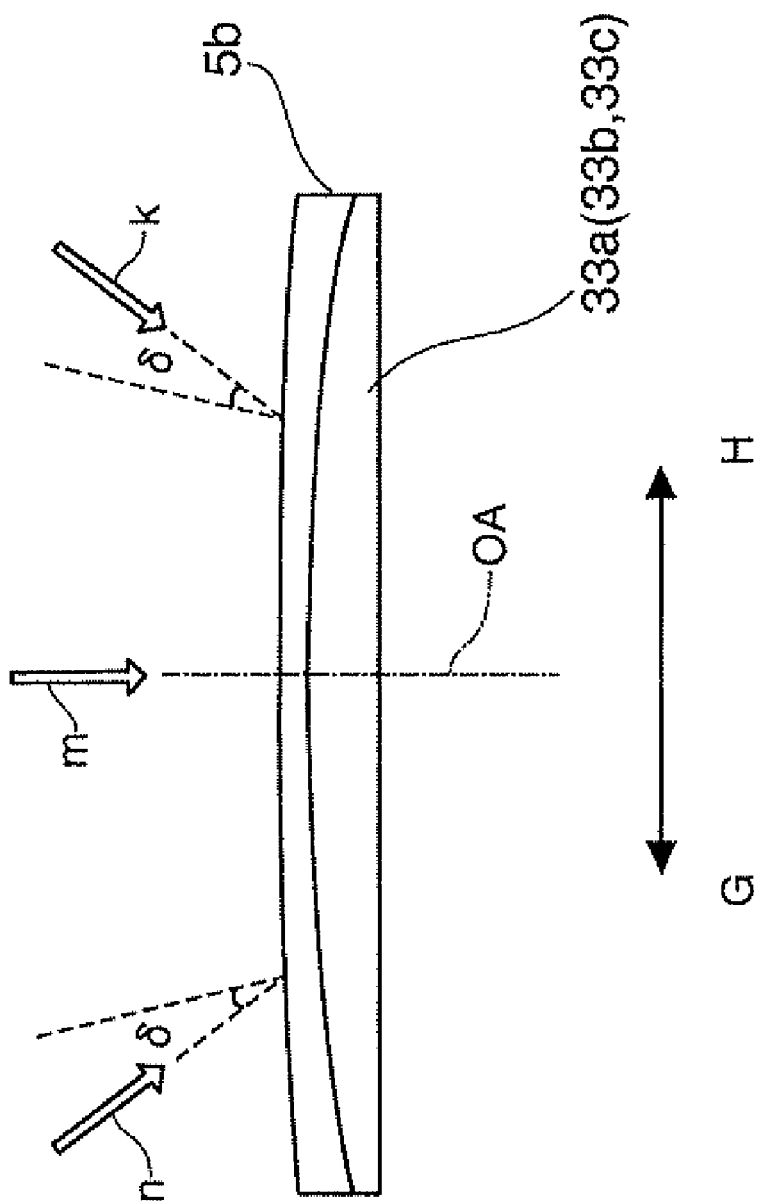
FIG. 9 shows a variation of the second embodiment.

In the second embodiment, while the dichroic mirrors 34a, 34b, and 34c are provided upstream of the field lenses 33a, 33b, and 33c to cut off predetermined wavelengths, a dichroic film 5b that corresponds to the dielectric multilayer film 4b may be coated on the surface of each of the field lenses 33a, 33b, and 33c, as shown in FIG. 9. In this case, an appropriate film thickness distribution that changes with the angle of incidence δ of the illumination light provides the transmittance characteristic in the right-left direction GH. This holds true in the up-down direction.

In the above embodiments, a high-pressure mercury lamp is used as the lamp used in the light source 10, but instead a metal-halide lamp or other lamps may be used.

In the above embodiments, while the first dichroic mirror 31a is disposed in such a way that it is inclined to the system optical axis OA of the illumination system 20 by 45 degrees, the first dichroic mirror 31a may be disposed at an arbitrary angle that provides optimal optical characteristics of the optical element. This holds true for the dichroic mirrors 34a, 34b, and 34c.

In the above embodiments, each of the first dichroic mirror 31a, the dichroic mirrors 34a, 34b, and 34c, and other components has any of the film thickness distributions shown in FIG. 2C, FIGS. 7A and 7B and other figures, but those shown in FIG. 2C, FIGS. 7A and 7B and other figures are presented only by way of example. Since the film thickness distribution changes when the structure of the dielectric multilayer films 3b and 4b and other dielectric multilayer films changes, the amount of gradient of the film thickness distribution and other parameters may be adjusted in accordance with the angle of incidence of a light beam incident on the first dichroic mirror 31a.

In the above embodiments, while a pair of fly-eye lenses 23a and 23b are used to divide the light from the light source 10 into a plurality of segmented light fluxes, the invention is also applicable to an image display apparatus using no such fly-eye lens, that is, a lens array. Further, each of the fly-eye lenses 23a and 23b can be replaced with a rod integrator.

In the above embodiments, while the polarization conversion element 24 that polarizes the light from the light source 10 in a specific direction, the invention is also applicable to an image display apparatus using no such polarization conversion element 24.

In the above embodiments, the description has been made with reference to a case where the invention is applied to a transmissive image display apparatus, but the invention is also applicable to a reflective image display apparatus. The word "transmissive" used herein means that the liquid crystal light valve including a liquid crystal panel is of light-transmitting type, and the word "reflective" used herein means that the liquid crystal light valve is of light-reflecting type. The optical modulator is not limited to a liquid crystal panel, but the optical modulator may use, for example, micromirrors.

As the image display apparatus, there are a front-type image display apparatus that projects an image from the side where the projection screen is observed, and a rear-type image display apparatus that projects an image from the side opposite to the side where the projection screen is observed. The configuration of any of the image display apparatus shown in FIG. 1 and other figures is applicable to either type of the above image display apparatus.

While the above embodiments have been described only with reference to the image display apparatus 100 and 110 using the three liquid crystal light valves 40a to 40c, the invention is also applicable to an image display apparatus using only one liquid crystal panel, an image display apparatus using two liquid crystal panels, and an image display apparatus using four or more liquid crystal panels.

In the above embodiments, while the color separation system 30, the liquid crystal light valves 40a, 40b, and 40c, and other components are used to modulate color light beams, these components can be replaced with an apparatus obtained by combining a color wheel illuminated by the light source 10 and the illumination system 20 with a device illuminated with light passing through the color wheel comprised of micromirror-based pixels to modulate and combine color light beams.

The entire disclosure of Japanese Patent Application No. 2008-026016, filed Feb. 6, 2008 is expressly incorporated by reference herein.

What is claimed is:

1. An image display apparatus comprising:
    a light source that emits light-source light;
    an illumination system that makes the light-source light uniform;
    a color separation system that separates illumination light outputted from the illumination system into color light fluxes;
    color optical modulators illuminated with the color light fluxes separated by the color separation system; and
    an optical element having an element surface the film thickness distribution of which is configured in such a way that the film thickness changes in a non-uniform manner,
    wherein the film thickness distribution is configured in such a way that:
        a rate of change in the optical characteristic changes with the position on the element surface in a first direction parallel to the element surface, and
        a rate of change in the optical characteristic changes with the position on the element surface in a second direction parallel to the element surface but inclined to the first direction by a predetermined angle.

2. The image display apparatus according to claim 1, wherein the film thickness distribution causes a transmission and reflection optical characteristic that corresponds to the angle of incidence of the illumination light to change in a non-uniform manner in the plane of the optical element.

3. The image display apparatus according to claim 2, wherein the optical characteristic of the optical element is a cutoff half-height wavelength that depends on the film thickness configuration of a multilayer film.

4. The image display apparatus according to claim 1, wherein the first direction is perpendicular to the second direction.

5. The image display apparatus according to claim 1, wherein the film thickness distribution has a portion where the magnitude of the gradient of the rate of change in the optical characteristic changes.

6. The image display apparatus according to claim 1, wherein the optical element is a dichroic mirror.

7. The image display apparatus according to claim 1, wherein the optical element is a dichroic film.

8. A projector comprising:
    the image display apparatus according to claim 1;
    a combining system that combines the color image light fluxes outputted from the color optical modulators; and
    a projection system that projects the image light that has passed through the combining system.

9. The projector according to claim 8, wherein the film thickness distribution causes a transmission and reflection optical characteristic that corresponds to the angle of incidence of the illumination light to change in a non-uniform manner in the plane of the optical element.

10. The projector according to claim 9, wherein the optical characteristic of the optical element is a cutoff half-height wavelength that depends on the film thickness configuration of a multilayer film.

11. The projector according to claim 8, wherein the first direction is perpendicular to the second direction.

12. The projector according to claim 8, wherein the film thickness distribution has a portion where the magnitude of the gradient of the rate of change in the optical characteristic changes.

13. The projector according to claim 8, wherein the optical element is a dichroic mirror.

14. The projector according to claim 8, wherein the optical element is a dichroic film.

* * * * *